US008752133B2

(12) United States Patent
An

(10) Patent No.: US 8,752,133 B2
(45) Date of Patent: Jun. 10, 2014

(54) SECURITY CONTROL SYSTEM AND METHOD FOR PERSONAL COMMUNICATION TERMINALS

(75) Inventor: Gaeil An, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 234 days.

(21) Appl. No.: 12/970,895

(22) Filed: Dec. 16, 2010

(65) Prior Publication Data

US 2011/0154442 A1    Jun. 23, 2011

(30) Foreign Application Priority Data

Dec. 18, 2009    (KR) .................. 10-2009-0126635

(51) Int. Cl.
*H04L 29/06*   (2006.01)
*G06F 15/16*   (2006.01)

(52) U.S. Cl.
USPC .................................... 726/3; 726/2

(58) Field of Classification Search
USPC ............ 726/2–3; 370/310, 338; 455/410, 466
See application file for complete search history.

(56) References Cited

U.S. PATENT DOCUMENTS

| 7,222,359 | B2 | 5/2007 | Freund et al. | |
|---|---|---|---|---|
| 2005/0181780 | A1 | 8/2005 | Park | |
| 2006/0135121 | A1* | 6/2006 | Abedi et al. | 455/410 |
| 2006/0205419 | A1* | 9/2006 | Sohn | 455/466 |
| 2006/0242685 | A1* | 10/2006 | Heard et al. | 726/3 |
| 2007/0101426 | A1 | 5/2007 | Lee et al. | |

FOREIGN PATENT DOCUMENTS

| JP | 2002-209022 A | 7/2002 |
|---|---|---|
| KR | 10-2005-0057884 A | 6/2005 |
| KR | 10-2007-0023480 A | 2/2007 |
| KR | 10-2007-0025042 A | 3/2007 |
| KR | 10-2007-0083494 A | 8/2007 |
| KR | 10-2008-0002144 A | 1/2008 |

OTHER PUBLICATIONS

Bill Schilit et al., "Context-Aware Computing Applications", Proceedings of IEEE Workshop Mobile Computing Systems and Applications, 1994, pp. 85-90, IEEE.
Gaeil AN et al., "Context-baed Remote Security Control for Mobile Communication Device", ISCIT, 2010, pp. 815-820, IEEE.

* cited by examiner

*Primary Examiner* — Brandon Hoffman
*Assistant Examiner* — Samuel Ambaye

(57) ABSTRACT

A security control system for personal communication terminals includes: a terminal registration agent for registering information on a personal communication terminal of a worker or visitor present within a security area into a terminal security control server and a zone notification node for providing the information of the personal communication terminal that has entered a control zone covered by the zone notification node in the security area when the personal communication terminal moves to the control zone. The system further includes the terminal security control server for installing a security control software module in the personal communication terminal, configuring computing resources and components permitted within the control zone based on a security control policy and zone information, and providing the configured computing resources and components to the personal communication terminal.

22 Claims, 6 Drawing Sheets

SECURITY CONTROL SYSTEM AND METHOD FOR PERSONAL COMMUNICATION TERMINALS

CROSS-REFERENCE(S) TO RELATED APPLICATION(S)

The present invention claims priority of Korean Patent Application No. 10-2009-0126635 filed on Dec. 18, 2009, which is incorporated herein by reference.

FIELD OF THE INVENTION

The present invention relates to security control for personal communication terminals, such as mobile phones, and more particularly, to a security control system and method for personal communication terminals, which can prevent information leakage using personal communication terminals by establishing a security control policy for personal communication terminals, carried by workers or visitors in security areas requiring security falling of organizations such as companies, laboratories, universities, institutions and the like and limiting the use of components and computing resources of personal communication terminals within security areas based on the security control policy.

BACKGROUND OF THE INVENTION

Organizations, such as companies, laboratories, universities, institutions or the like, are concerning about security to protect their important assets including important information and information systems from information leakage and the risk of system destruction. The important assets of an organization may be damaged or leaked in an indirect way via a network or a direct way by using equipment, such as a laptop, a universal serial bus (USB) memory, camera or the like within the organization.

To completely avoid the risk of damage or leakage of important assets caused by the aforementioned direct way, some organizations ban visitors from bringing in equipment, such as laptops, cameras or the like which may be used to leak information, or more strictly, they allow their workers to bring in only a limited range of equipment. The most typical equipment that visitors and workers are usually permitted to bring in is personal communication terminals, because using the personal communication terminals is so closely related to our daily lives and work.

Meanwhile, there was no big problem in the past when a person communication terminal only provided the simple functions, such as telephone service. However, as a person communication terminal is being developed into an intelligent terminal that provides, in a single unit, all of multi-communication services via a number of communication interfaces, such as code division multiple access (CDMA), Bluetooth, wireless fidelity (WiFi), and wireless broadband (Wibro), and multimedia services, such as a camera, internet protocol television (IPTV), and navigation. Therefore, the personal communication terminal is now becoming a threat to security as a laptop and a camera are.

That is to say, if the use of personal communication terminals is permitted in an area of an organization, this means that it is permitted to bring in equipment, which may be a potential threat to security, such as a camera, USB memory, wireless communication device or the like provided by a personal communication terminal itself, which can be critical to the security of the organization.

To solve such security problems, personal communication terminals may be banned from being carried, or an organization may provide separate terminals for visitors only offer simple functions such as voice calls.

However, the restriction of carriage of personal communication terminals causes a problem in that it is inconvenient for users, and the provision of separate terminals replacing personal communication terminals has a problem in that user inconvenience and, further, work efficiency are reduced because the separate terminals cannot replace the functions of the personal communication terminals.

SUMMARY OF THE INVENTION

Therefore, the present invention provides a security control system and method for personal communication terminals, such as mobile phones, which can prevent information leakage using personal communication terminals by establishing a security control policy for personal communication terminals in security areas of organizations and limiting the use of components and computing resources of personal communication terminals within security areas based on the security control policy.

In accordance with an aspect of the present invention, there is a security control system for personal communication terminals including: a terminal registration agent for registering information on a personal communication terminal of a worker or visitor present within a security area into a terminal security control server, a security control policy for the personal communication terminal, and information of components to be provided; a zone notification node for providing the information of the personal communication terminal that has entered a control zone covered by the zone notification node in the security area when the personal communication terminal moves to the control zone; and the terminal security control server for installing a security control software module in the personal communication terminal, configuring computing resources and components permitted within the control zone based on a security control policy and zone information, and providing the configured computing resources and components to the personal communication terminal.

In accordance with another aspect of the present invention, there is provided a security control method for personal communication terminals including: registering information of a personal communication terminal present of a worker or a visitor within a security area, a security control policy for the personal communication terminal, and information of components to be provided; installing a security control software module in the personal communication terminal to control the use of computing resources of the personal communication terminal; identifying a zone within the security area where the personal communication terminal is located; and configuring the computing resources and components permitted within the zone based on a security control policy and providing the configured computing resources and components to the personal communication terminal.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Hereinafter, embodiments of the present invention will be described in detail with reference to the accompanying drawings which form a part hereof.

Figure 1:
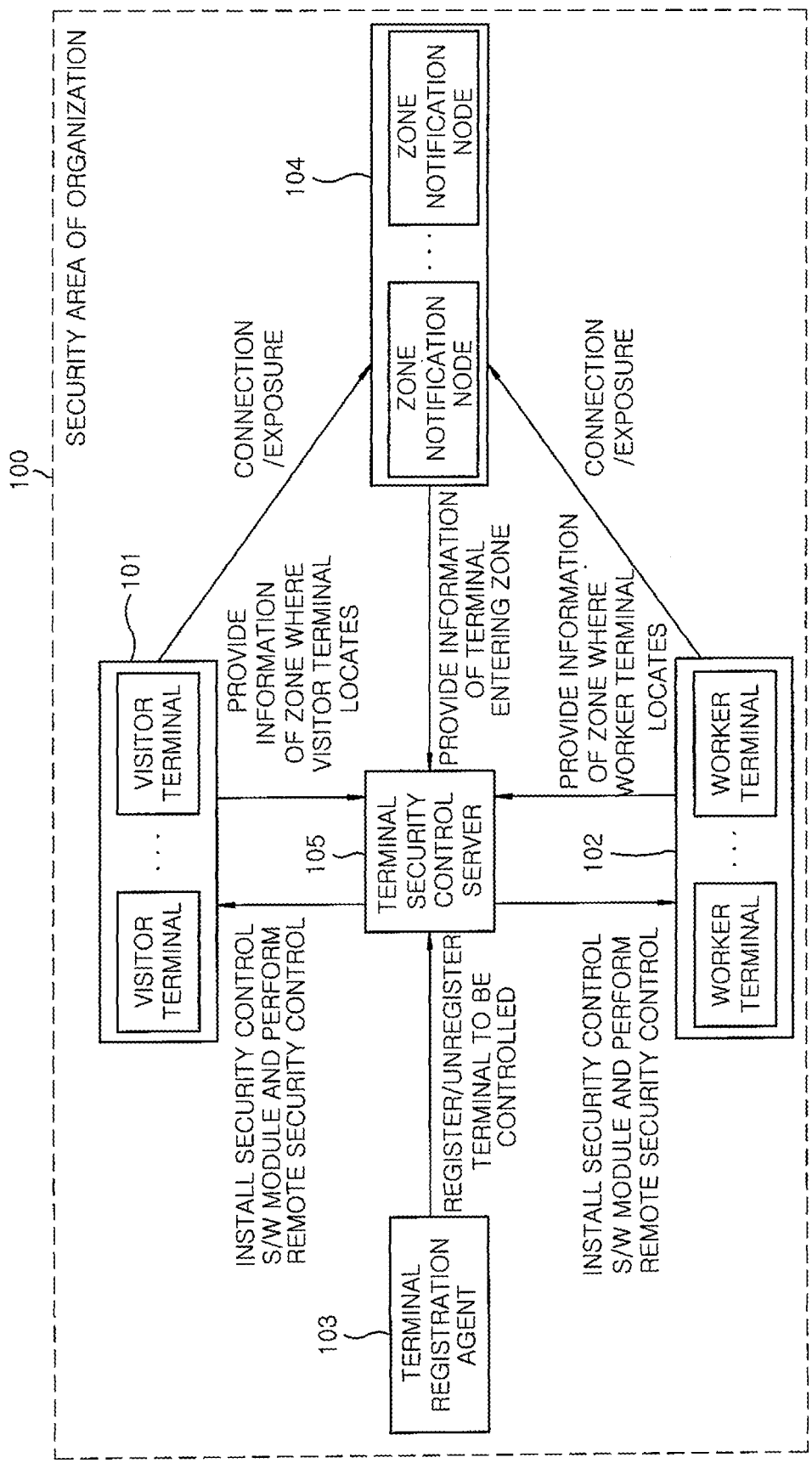
FIG. 1 shows a system configuration diagram for security control of personal communication terminals within a security area in accordance with an embodiment of the present invention.

FIG. 1 shows a configuration of a security control system for personal communication terminals in accordance with an embodiment of the present invention. The security control system for personal communication terminals includes a terminal registration agent 103, a terminal security control server 105, a zone notification node 104, a worker terminal 102, and a visitor terminal 101.

Hereinafter, the operation of each component of the security control system for personal communication terminals will be described in detail with reference to FIG. 1. In this security control system for personal communication terminals, a personal communication terminal of a visitor (hereinafter, referred to as "visitor terminal") and a personal communication terminal of a worker (hereinafter, referred to as "worker terminal") first need to be registered in the terminal security control server 105 by the terminal registration agent 103 to be used within a coverage area of an organization requiring security.

The terminal registration agent 103 registers the visitor terminal 101 in the terminal security control server 105 when the visitor arrives at the organization, and the terminal security control server 105 unregisters the visitor terminal 101 when the visitor leaves the organization. Further, the terminal registration agent 103 registers control policy for the visitor terminal 101, and information of components to be provided to the visitor terminal 101.

The worker terminal 102 is registered in the terminal security control server 105 when a worker joins the organization and starts working in a security area 100, which is a coverage area of the organization, and unregistered when he or she leaves the organization. The terminal registration agent 103 provides terminal information, including terminal identifier, classification of employee, ownership, position, rights of access or the like to the terminal security control server 105 when registering a personal communication terminal.

The zone notification node 104 detects the visitor terminal 101 and the worker terminal 102 that have entered its control zone, which may be a smart CCTV camera with which video recognition technique is applied or equipment of WiFi, Bluetooth, ZigBee, or the like, and provides information on a personal communication terminal to the terminal security control server 105 each time it finds a new personal communication terminal.

The visitor terminal 101, which is a personal communication terminal of a visitor visiting a security area of the organization, is registered by the terminal registration agent 103, and then has a security control software module transmitted remotely from the terminal security control server 105 installed therein. Thus, the use of computing resources and components of the terminal is controlled by the security control software module based on a security control policy set up in the visitor terminal 101 within the security area 100.

In the worker terminal 102, a security control software module transmitted through radio communication from the terminal security control server 105 is installed therein. After initial registration by the terminal registration agent 103, the terminal is recognized by the terminal security control server 105, when the worker terminal reaches or leaves the security area 100, to control the components and computing resources of the terminal.

Upon detecting a movement to another zone through a connection to the zone notification node 104, the above-described visitor terminal 101 and worker terminal 102 receive information on the new zone from the zone notification node 104 and transmits it to the terminal security control server 105.

The terminal security control server 105 performs the security control of the visitor terminal 101 and the worker terminal 102 present within the security area 100 of the organization. The terminal security control server 105 performs the security control of the visitor terminal 101 and the worker terminal 102 by remotely transmitting the security control software modules to the visitor terminal 101 and the worker terminal 102 reported from the terminal registration agent 103 to be installed therein, and configuring the computing resources and components permitted within a corresponding zone to provide them to the personal communication terminal based on the security control policy for user information (worker/visitor) of each terminal and depending on zone information about where the visitor terminal 101 or worker terminal 102 is located.

In addition, the terminal security control server 105 manages a database 202 including a security control software module for terminals, components, terminal information, zone information, terminal security control policy and the like in order to provide remote security control for the visitor terminal 101 and the worker terminal 102.

Figure 2:
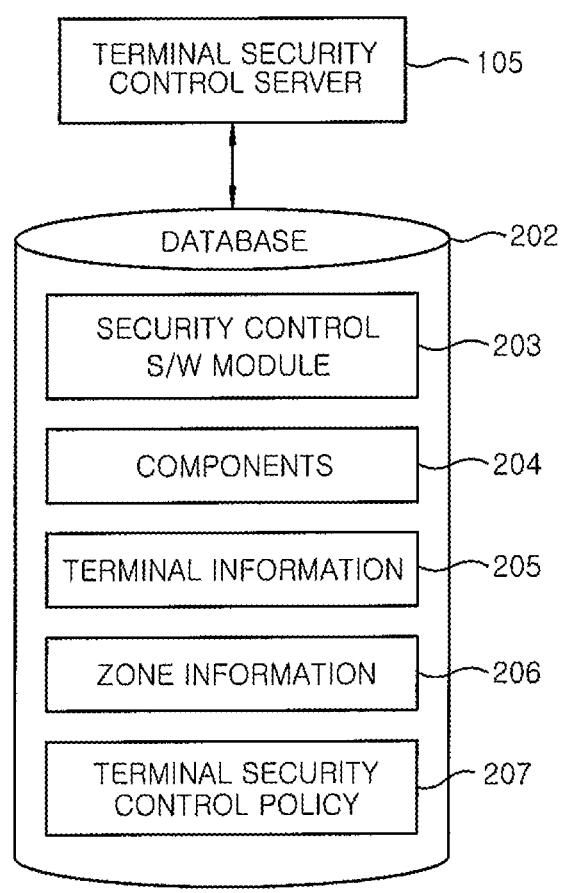
FIG. 2 provides a configuration of a database in a terminal security control server in accordance with the embodiment of the present invention.
Figure 3:
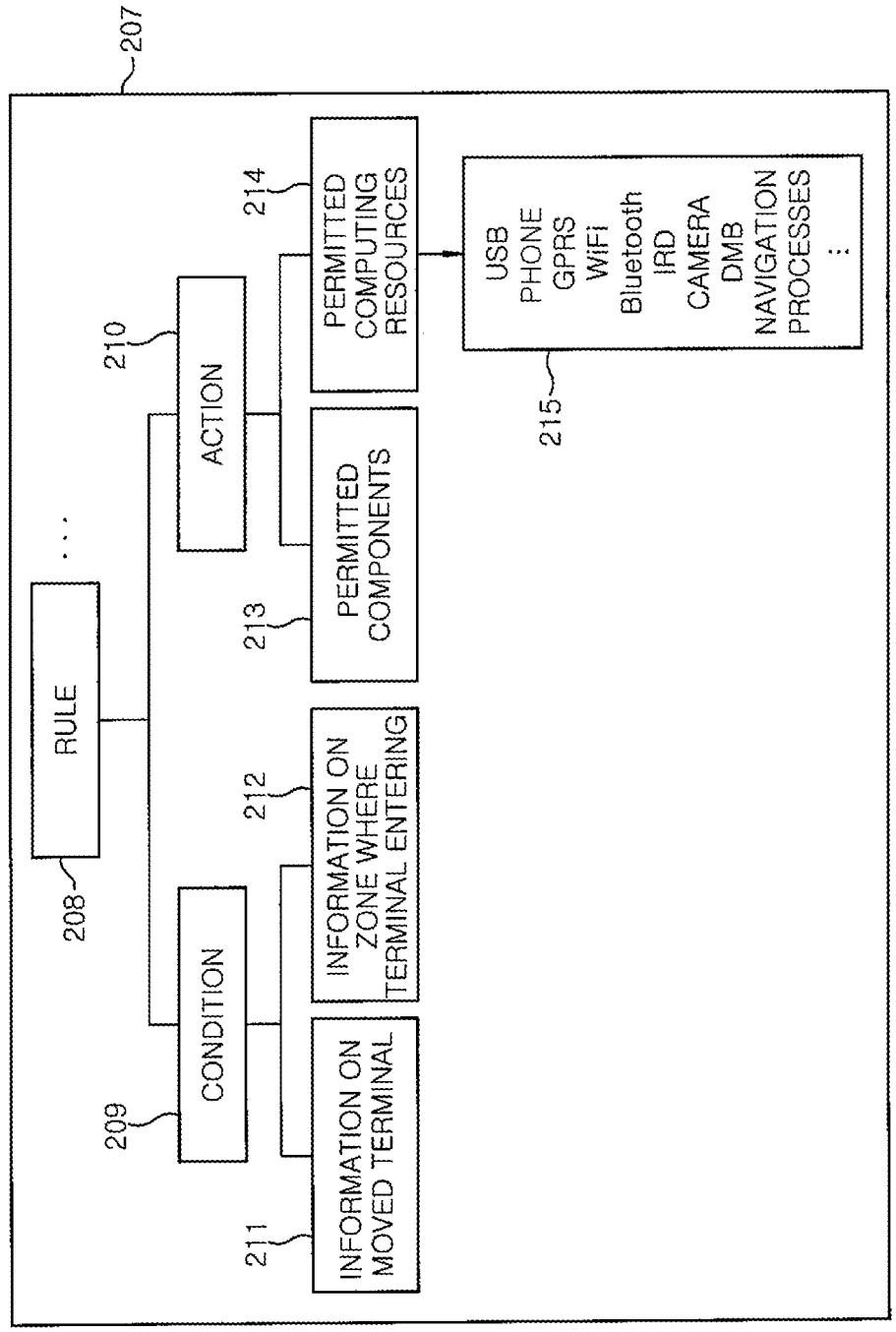
FIG. 3 illustrates a configuration of a security control policy in accordance with the present invention.

FIG. 2 schematically shows the database 202 managed by the terminal security control server 105 and FIG. 3 illustrates a configuration of the security control policy in accordance with the present invention.

Hereinafter, information of the database 202 managed by the terminal security control server 105 will be described with reference to FIG. 2.

A security control software module 203 for terminals is a program capable of controlling (i.e., on/off) the computing resources of the visitor terminal 101 or worker terminal 102, such as files, wireless fidelity (WiFi), general packet radio service (GPRS), universal serial bus (USB), phone, processes and the like. Components 204 refer to digital materials, such as meeting material, a company map, and a video player, in the form of text, audio, image, execution file or the like to be provided to the visitor terminal 101 or worker terminal 102.

Terminal information 205 is information on one or more visitor terminals 101 or worker terminals 102 that belong to the security area 100. Each of the visitor terminals 101 or worker terminals 102 is distinguished by information, such as terminal identifier, classification of employee (visitor or worker), ownership, position, rights of access, history information of visited zones and the like.

Zone information 206 is information on one or more zones established within the security area 100. Each of the zones is distinguished by zone identifier points information, such as AP type (e.g., CCTV camera, WiFi, Bluetooth, or the like), locations (e.g., main entrance, meeting room, lobby on the first floor, laboratory on the second floor or the like), zone managers, purpose of each zone (e.g., private office room, and the like).

A terminal security control policy 207 is used to determine the security control of the terminal when the terminal 101 or 102 moves to another zone, and has one or more rules 208 as shown in FIG. 3. Each rule includes a condition 209 and an action 210 which is taken when the condition is satisfied. The condition 209 includes information 211 of the moved terminal and information 212 of the zone to which the terminal has moved. Action 210 includes permitted components 213 and permitted computing resources 214. Here, the computing resources 215 refer to files, USB, GPRS, WiFi, camera, DMB, processes, or the like of the terminal 101 or 102.

Upon receipt of information on the terminal 101 or 102 that moves to another zone within the security area 100 from the visitor terminal 101, the worker terminal 102 or the zone notification node 104, the terminal security control server 105 updates history information of visited zones in the terminal information 205 of the database 202.

Also, based on the information (e.g., terminal identifier, classification of employee, rights of access and the like) of the visitor terminal 101 or worker terminal 102 and depending on the information as to where the visitor terminal 101 or worker terminal 102 is currently located, a rule satisfying this condition is searched in the terminal security control policy 207, and the permitted components (e.g., meeting material) and permitted computing resources (e.g., only USB and GPRS are permitted) specified as the action of the rule are applied remotely to the visitor terminal 101 or worker terminal 102.

Figure 4:
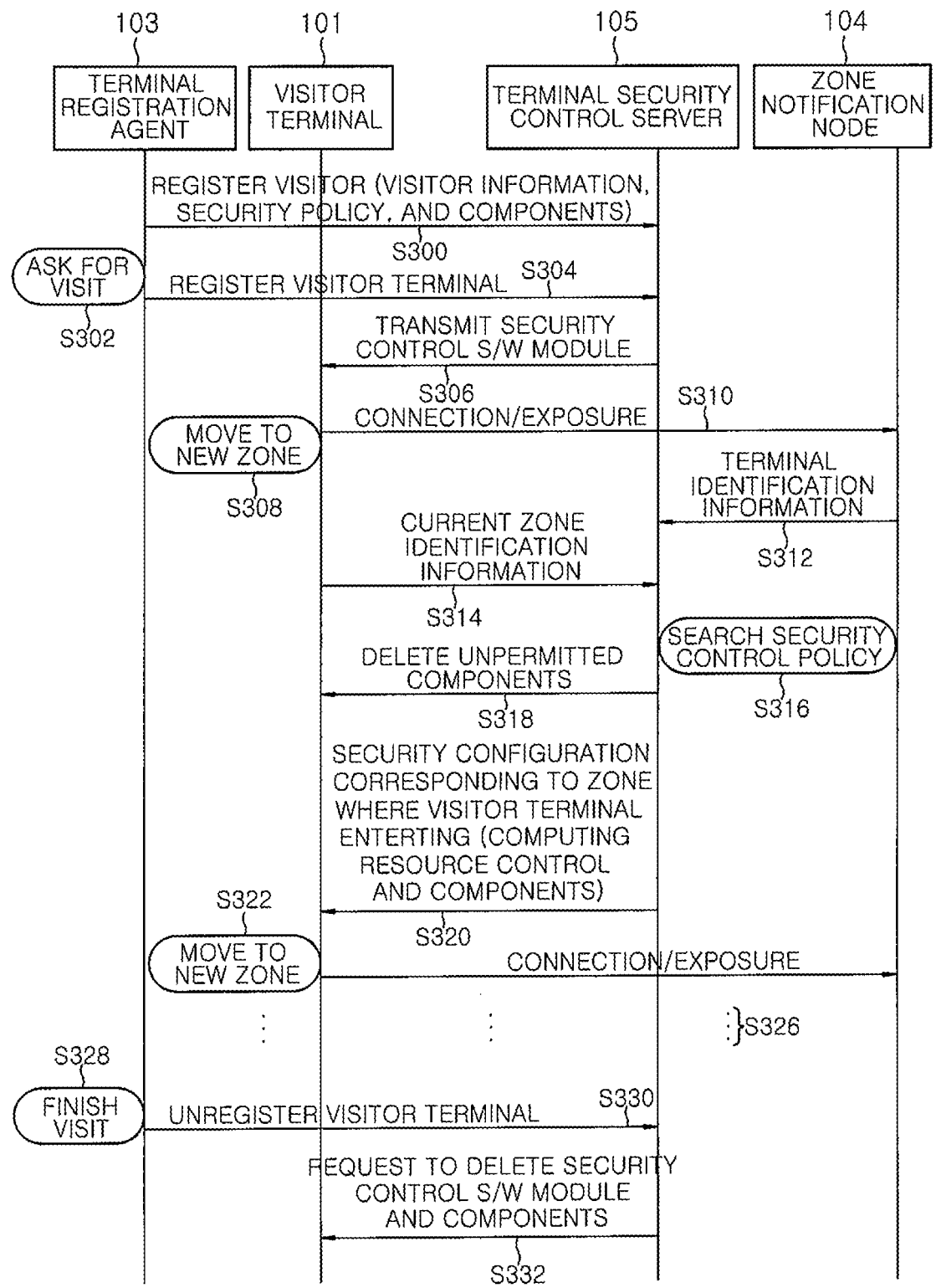
FIG. 4 illustrates an operational flowchart for security control of a visitor terminal within the security area in accordance with the embodiment of the present invention.

FIG. 4 shows an operational control flow for performing the security control of the visitor terminal 101 that has entered the security area 100 in accordance with the embodiment of the present invention.

First, the terminal registration agent 103 registers user information (e.g., name, organization or the like) of a visitor, a security control policy, and components (e.g., meeting material, a company map or the like) to be provided in the terminal security control server 105 in advance in step S300.

That is, when the visitor arrives at the organization and asks registering the visitor terminal 101 through the terminal registration agent 103 in step S302, the terminal registration agent 103 registers the visitor terminal 101 in the terminal security control server 105 in step S304. Then, the terminal security control server 105 remotely installs a security control software module for terminals in the visitor terminal 101 in step S306.

The visitor terminal 101 having the security control software module installed therein as above is restricted from the use of computing resources within the security area 100 under the control of the security control software module.

Subsequently, when the visitor moves within the security area 100 and the visitor terminal 101 having the security control software module installed therein moves to a new zone in step S308, the visitor terminal 101 is detected by the zone notification node 104 located in the zone to which it has moved in step S310. Then, the zone notification node 104 notifies the terminal security control server 105 of identification information of the visitor terminal in step S312. Further the visitor terminal 101 receives, from the zone notification node 104, the identification information of the zone to which it has moved, and notifies the terminal security control server 105 of this information in step S314.

With this, the terminal security control server 105 can detect the use of an unpermitted terminal in the security area 100 of the organization by checking whether the terminal reported to have entered a control zone from the zone notification node 104 is a registered terminal.

Moreover, the terminal security control server 105 can determine whether the security control software module for terminals mounted in the visitor terminal 101 normally operates by checking whether the terminal reported from the zone notification node 104 provides with zone identification information in step S314, and can determine whether the visitor terminal 101 provides false information or not by comparing the terminal identification information provided by the zone notification node 104 with the zone identification information provided by the terminal 101.

Upon receiving a report from the zone notification node 104 and the visitor terminal 101 that the visitor terminal 101 has moved to another zone, the terminal security control server 105 searches a terminal security control policy to determine the security configuration of the visitor terminal 101 in step S316.

Next, the terminal security control server 105 remotely deletes, from the visitor terminal 101, components not permitted in the zone where the visitor terminal 101 has moved, through the security control software module based on the searched security control policy in step S318, and remotely sets up and provides permitted computing resources and components in step S320.

At this point, as the visitor moves within the security area 100, the visitor terminal 101 is located in a new zone. In this way, whenever the visitor terminal 101 moves to a new zone in step S322, it is subject to security control by the terminal security control server 105 in step S326.

Meanwhile, when the user of the visitor terminal 101 finishes the visit in step S328, the terminal registration agent 103 requests the terminal security control server 105 to unregister the visitor terminal in step S330. Then, the terminal security control server 105, having received the request to unregister the terminal, remotely deletes the security control software module from the terminal 101 and the components, which have been installed in the visitor terminal 101 and are unpermitted to be taken out in step S332.

Figure 5:
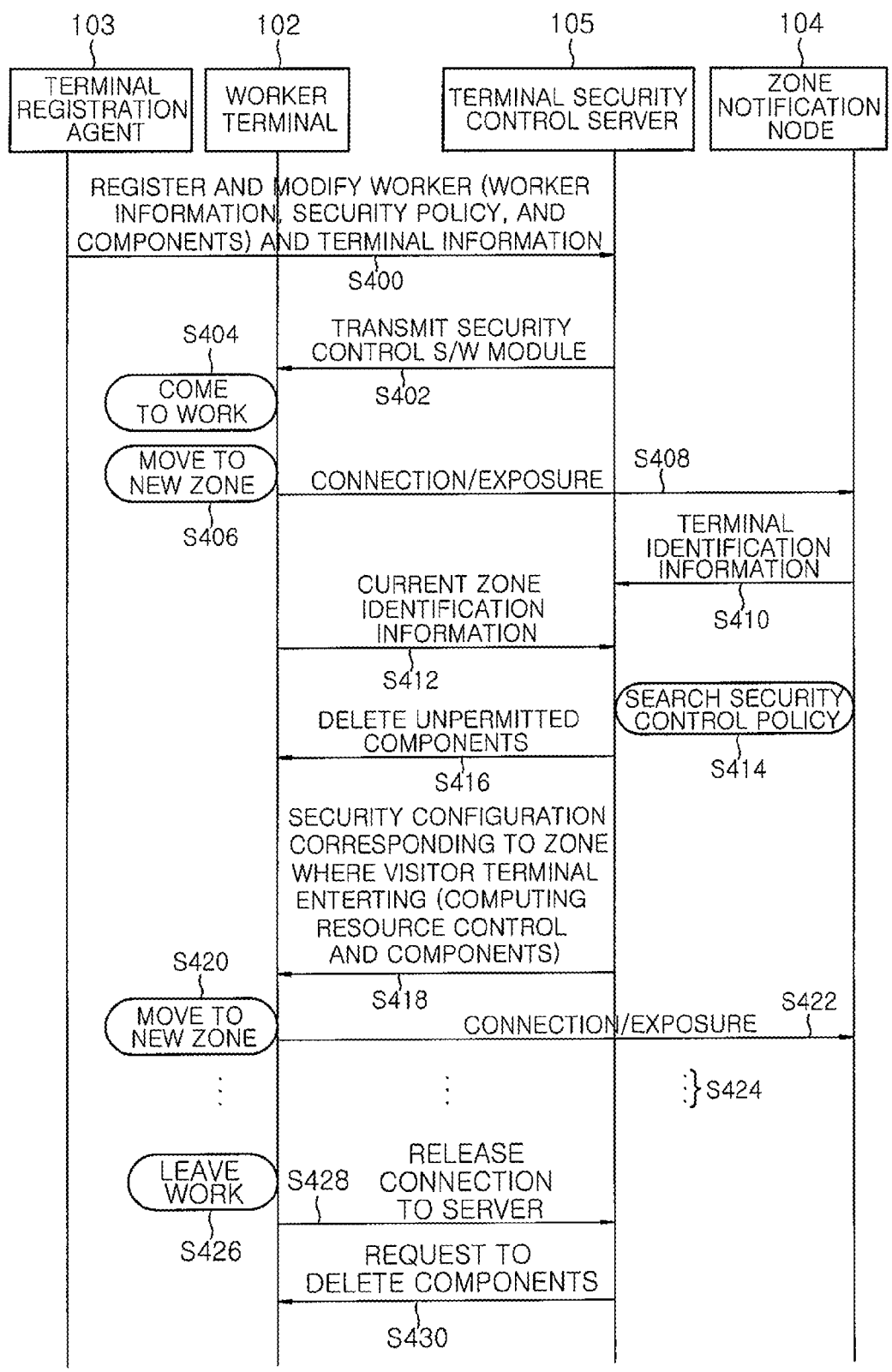
FIG. 5 offers an operational flowchart for security control of a worker terminal within the security area in accordance with the embodiment of the present invention.

FIG. 5 shows an operational control flow for performing the security control of the worker terminal working within the security area 100 in accordance with another embodiment of the present invention. First, the terminal registration agent 103 registers or modifies user information (e.g., name, department or the like) of a worker, a security control policy, and components (e.g., meeting material, a company map or the like) to be provided in the terminal security control server 105 in advance in step S400.

Then, the terminal security control server 105 remotely installs a security control software module in the worker terminal 102 in order to forcibly execute the security control of the initially registered worker terminal 102 in step S402.

The worker terminal 102 having the security control software module installed therein is restricted from the use of computing resources within the security area 100 by the security control software module.

Next, if the worker comes to work and moves within the security area 100 in step S404 and the worker terminal 102 having the security control software module installed therein moves to a new zone in step S406, the worker terminal 102 is detected by the zone notification node 104 located in the zone to which it has moved in step S408. Then, the zone notification node 104 notifies the terminal security control server 105 of identification information of the worker terminal 102 in step S410. Further, the worker terminal 102 receives, from the zone notification node 104, the identification information of the zone to which it has moved, and notifies the terminal security control server 105 of this information in step S412.

With this, the terminal security control server 105 can detect the use of an unregistered terminal in the security area 100 of the organization by checking whether the terminal reported to have entered a control zone from the zone notification node 104 is a registered terminal.

Moreover, the terminal security control server 105 can determine whether the security control software module for terminals mounted in the worker terminal 102 normally operates by checking whether the terminal reported from the zone notification node 104 provides with zone identification information in step S412. The terminal security control server 105 can also determine whether the worker terminal 102 provides false information by comparing the terminal identification information provided by the zone notification node 104 with the zone identification information provided by the terminal 102.

Upon receiving a report from the zone notification node 104 and the worker terminal 102 that the worker terminal 102 has moved to another zone, the terminal security control server 105 searches a terminal security control policy to determine the security configuration of the worker terminal 102 in step S414.

Next, the terminal security control server 105 remotely deletes, from the worker terminal 102, components not permitted in the zone where the worker terminal 102 has moved, through the security control software module based on the searched security control policy in step S416, and remotely sets up and provides permitted computing resources and components in step S418.

At this point, as the worker moves within the security area 100, the worker terminal 102 is located in a new zone. In this way, whenever the worker terminal 102 moves to a new zone in step S420, it is subject to security control by the terminal security control server 105 in step S424.

Meanwhile, when the user of the worker terminal 102 is to leave work and get out of the security area in step S426, the worker terminal 102 requests the terminal security control server 105 to release the terminal's connection to the server in step S428. Then, the terminal security control server 105, having received the request to release the terminal's connection to the server, remotely deletes the components installed in the worker terminal 102 and are unpermitted to be taken out in step S430.

Figure 6:
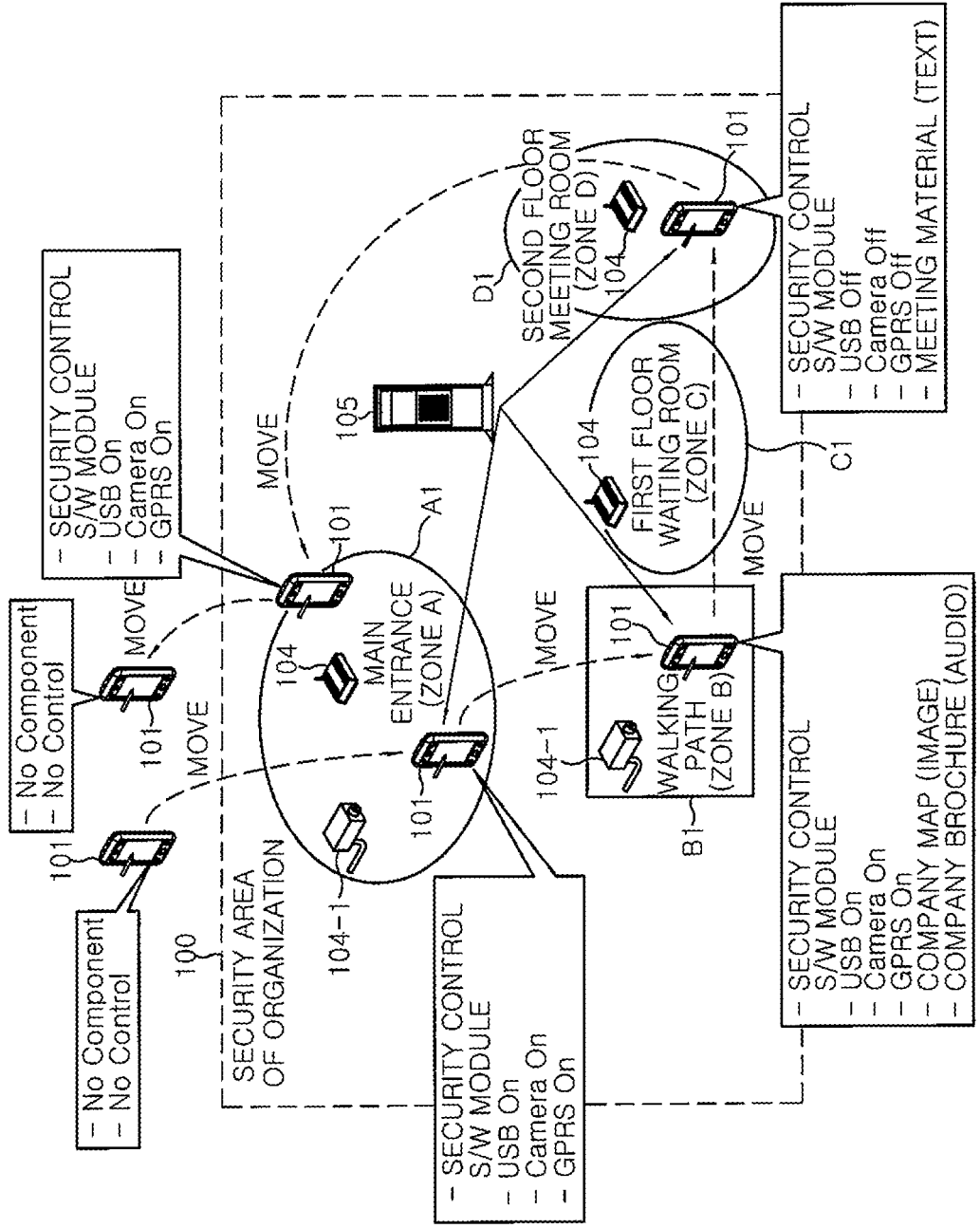
FIG. 6 depicts a conceptual diagram for forced security control of a visitor terminal within the security area in accordance with the present invention.

FIG. 6 depicts a schematic diagram of the concept of security control of a personal communication terminal of a visitor entering the security area 100 of the organization in accordance with the present invention. The security area of the present invention includes, for example, four zones: a main entrance A1; a walking path B1; a first floor waiting room C1; and a second floor meeting room D1. Each of the zones can be managed by one or more zone notification nodes 104 and 104-1.

First, a visitor terminal 101 before entering a security area 100 has no component and is not under security control, as shown in FIG. 6.

However, when the visitor terminal 101 enters the security area 100 and is registered in the security control server 105, the terminal security control server 105 remotely installs a security control software module in the visitor terminal 101, and forcibly controls the use of computing resources of the visitor terminal 101 through the security control software module. At this time, the terminal security control server 105 can, for example, define and apply three rules as shown in FIG. 6 as a security control policy to control the visitor terminal 101.

An example of the terminal security control policy configured by the terminal security control server 105 is as follows.

<RULE 1>
CONDITION: TERMINAL=VISITOR*ZONE: MAIN ENTRANCE
ACTION: PERMITTED COMPONENT: Camera: On, USB: On, GPRS: On
<RULE 2>
CONDITION: TERMINAL=VISITOR*ZONE: WALKING PATH
ACTION: PERMITTED COMPONENT: COMPANY MAP, AUDIO COMPANY BROCHURE, Camera: On, USB: On, GPRS: On
<RULE 3>
CONDITION: TERMINAL=VISITOR*ZONE: SECOND FLOOR MEETING ROOM
ACTION: PERMITTED COMPONENT: MEETING MATERIAL, Camera: Off, USB: Off, GPRS: Off Terminal Security Control Policy That is, when the visitor terminal 101 is located at the main entrance A1, the terminal security control server 105 configures security to permit the use of computing resources, such as USB, camera, GPRS and the like based on the security control policy.

Next, when the visitor terminal 101 moves to the walking path B1, the terminal security control server 105 configures security on the visitor terminal 101 to permit the use of computing resources, such as USB, camera, GPRS, etc., and remotely provides a company map and an audio company brochure, which are permitted components.

Thereafter, when the visitor terminal 101 moves again to the second floor meeting room D1, the terminal security control server 105 remotely configures security so that the visitor terminal 101 cannot use USB, camera, and GPRS, remotely deletes the company map and company brochure, which are the previously permitted components, and remotely provides a permitted component, i.e., meeting material.

Finally, when the visitor terminal 101 moves to the main entrance A1 and finishes the visit, the terminal security control server 105 remotely deletes the security control software module installed in the visitor terminal 101 and all the components which are unpermitted to be taken out. Now, the visitor terminal 101 having finished the visit returns to the state before the visit the security area 100, with no component at all, and enters into a state not subject to security control.

As described above, the security control system and method for personal communication terminals in accordance with the embodiment of the present invention can prevent security risk factors such as information leakage and virus distribution in advance by using personal communication terminals by establishing a security control policy to control components and computing resources of personal communication terminals, such as mobile phones, carried by workers or visitors in security areas requiring security of organizations like companies, laboratories, universities, institutions or the like; installing a security control software module capable of controlling the use of components and computing resources of personal communication terminals in each personal communication terminal located within the security areas; and limiting the use of components and computing resources of personal communication terminals located within the security areas based on the previously established security control policy and depending on where terminal users are located.

While the invention has been shown and described with respect to the particular embodiments, it will be understood by those skilled in the art that various changes and modification may be made without departing from the scope of the invention as defined in the following claims.

What is claimed is:

1. A security control system for a personal communication terminal in a security area including at least one control zone, the system comprising:
   a terminal registration agent configured to generate user information of a the personal communication terminal, a security control policy including at least one rule that includes location information as a condition, and information of components to be provided to the personal communication terminal according to a control zone in which the personal communication terminal is located, and register the user information, the security control policy, and the information of components into a terminal security control server before the personal communication terminal enters the control zone;
   a zone notification node configured to provide the terminal security control server with the location information of the personal communication terminal that enters the control zone covered by the zone notification node in the security area;
   a security control software module configured to provide the terminal security control server with the location information of the personal communication terminal to receive a list of computing resources and components permitted within the control zone in which the personal communication terminal is located from the terminal security control server, and control the personal communication terminal to use the permitted computing resources and components; and
   the terminal security control server configured to:
   install the security control software module in the personal communication terminal when the personal communication terminal enters the security area but before the personal communication terminal enters the control zone,
   receive the location information of the personal communication terminal from the zone notification node and the security control software module,
   configure the computing resources and the components permitted within the control zone based on the security control policy and the location information of the personal communication terminal, and
   provide the list of the configured computing resources and the configured components to the personal communication terminal.

2. The system of claim 1, wherein the terminal security control server is configured to delete, from the personal communication terminal, components not permitted within the control zone among the components provided to the personal communication terminal through the security control software module based on the location information of the personal communication terminal.

3. The system of claim 1, wherein the terminal security control server is configured to prevent computing resources not permitted within the control zone from being used in the personal communication terminal through the security control software module based on the location information of the personal communication terminal.

4. The system of claim 1, wherein the terminal security control server is configured to distinguish between a worker and a visitor in the security area based on the user information of the personal communication terminal, and adaptively modify and set up the security control policy for the personal communication terminal to correspond to any of the worker and the visitor, respectively.

5. The system of claim 1, wherein when the personal communication terminal exits the security area, the terminal security control server is configured to delete the security control software module installed in personal communication terminal.

6. The system of claim 1, wherein the computing resources include any of wireless fidelity (WiFi), general packet radio service (GPRS), universal serial bus (USB), and phone or camera resources mounted in the personal communication terminal.

7. The system of claim 1, wherein the components include digital materials including text, audio, image, or various execution files that are executed in the personal communication terminal.

8. The system of claim 1, wherein the security control software module is remotely transmitted from the terminal security control server to the personal communication terminal through radio communication and installed in the personal communication terminal.

9. The system of claim 1, wherein the zone notification node is configured to detect the personal communication terminal that enters the control zone and provide the terminal security control server with the information of the personal communication terminal upon the detection of the entering of the personal communication terminal, and
   wherein the information of the personal communication terminal includes the location information, and the zone notification node includes a smart CCTV camera or equipment of WiFi or other wireless communications.

10. The system of claim 1, wherein the security control software module provides the terminal security server with zone information of the control zone in which the personal communication terminal is located, the zone information of the control zone including the location information of the personal communication terminal.

11. The system of claim 1, wherein the security area is divided into multiple control zones depending on locations, purposes and departments of the respective control zones.

12. A security control method for a personal communication terminal in a security area including at least one control zone, the method comprising:
   registering, before the personal communication terminal enters a control zone, user information of the personal communication terminal, a security control policy including at least one rule that includes location information as a condition, and information of components to be provided to the personal communication terminal according to the control zone in which the personal communication terminal is located;
   installing, when the personal communication terminal enters the security area but before the personal communication terminal enters the control zone, a security control software module in the personal communication terminal and generating location information of the personal communication terminal;
   identifying the control zone in which the personal communication terminal is located within the security area using location information received from the security control software module and a zone notification node provided to generate the location information of the personal communication terminal;
   configuring computing resources and components permitted within the identified control zone based on the security control policy and the received location information, and providing the configured computing resources and components to the personal communication terminal; and controlling the personal communication terminal to use the permitted computing resources and components.

13. The method of claim 12, further comprising:

deleting, from the personal communication terminal, components not permitted within the control zone through the security control software module based on the location information of the personal communication terminal.

14. The method of claim 12, further comprising:

preventing computing resources not permitted within the zone from being used in the personal communication terminal through the security control software module based on the location information of the personal communication terminal.

15. The method of claim 12, further comprising:

when the personal communication terminal exits the security area, deleting the security control software module installed in the personal communication terminal.

16. The method of claim 12, further comprising adaptively modifying or setting up the security control policy to correspond to any of a worker and a visitor, respectively, within the security area, the worker and the visitor being distinguished from each other based on the user information of the personal communication terminal.

17. The method of claim 12, wherein the computing resources include any of wireless fidelity (WiFi), general packet radio service (GPRS), universal serial bus (USB), and phone or camera resources mounted in the personal communication terminal.

18. The method of claim 12, wherein the components include digital materials including text, audio, image, or various execution files that are executed in the personal communication terminal.

19. The method of claim 12, wherein the security area is divided into multiple control zones depending on locations, purposes, and departments of the respective control zones.

20. The method of claim 12, wherein the control zone in which the personal communication terminal is located is identified by using a smart CCTV camera or equipment of WiFi or other wireless communications installed in multiple control zones of the security area.

21. The system of claim 10, wherein the personal communication terminal is configured to receive the zone information from the zone notification node and provide the received zone information to the terminal security control server.

22. The method of claim 12, wherein said generating of the location information of the personal communication terminal includes generating zone information of the control zone in which the personal communication terminal is located, the zone information of the control zone including the location information of the personal communication terminal.

* * * * *